United States Patent

[11] 3,589,109

| [72] | Inventor | Amos O. Payne<br>Eldridge, Iowa |
|------|----------|---------------------------------|
| [21] | Appl. No. | 799,198 |
| [22] | Filed | Feb. 14, 1969 |
| [45] | Patented | June 29, 1971 |
| [73] | Assignee | J. I. Case Company<br>Racine, Wis. |

[54] CONTROL SYSTEM FOR FLUID MOTOR
8 Claims, 3 Drawing Figs.

[52] U.S. Cl.................................................... 56/10.2
[51] Int. Cl..................................................... A01d 41/02
[50] Field of Search........................................... 56/20, 21,
208, 210, DIG. 15

[56] References Cited
UNITED STATES PATENTS
2,639,569  5/1953  Pasturczak .................... 56/20
3,309,852  3/1967  Allen............................. 56/208
3,466,854  9/1969  Ashton et al.................. 56/21
3,470,681  10/1969  Saemann...................... 56/20

*Primary Examiner*—Russell R. Kinsey
*Attorney*—Settle, Batchelder & Oltman

ABSTRACT: A speed control unit for controlling the speed of a device driven by a hydraulic motor and in which the speed of the device is controlled by the flow of pressured fluid to the fluid motor. The speed control unit includes a first element which is rotated as a function of the speed of the harvesting machine and a second element which is rotated as a function of the speed of the device with means for automatically varying the flow of fluid whenever either of the element's rotational speed is varied.

INVENTOR.
AMOS O. PAYNE.
BY
SETTLE, BATCHELDER & OLTMAN.
ATT'YS.

3,589,109

1

CONTROL SYSTEM FOR FLUID MOTOR

BACKGROUND OF THE INVENTION

The present invention relates generally to fluid motor control systems and more particularly to an improved mechanism for automatically maintaining the speed of a fluid motor-driven device at a predetermined ratio with respect to the speed of some other given device.

In harvesting machines, such as self-propelled-type combines, it is customary in one operational aspect to harvest standing grain by cutting the grain below the heads with a conventional-type sickle and forcing the cut portion for the harvested crop into a threshing mechanism by a conventional harvesting reel. The efficiency of the cutting mechanism and the damage to the harvested material is dependent to a considerable extent upon having a proper relationship between the speed of the combine and the rotational speed of the harvesting reel. Thus, it is desirable to be operating the harvesting reel at a rotational speed which is slightly greater than the rotational speed of the main axle for the drive mechanism of the vehicle.

Normally, harvesting or combine reels are driven by a belt or chain which is connected in some manner to the prime mover of the vehicle. In most instances the reel drive incorporates some adjustment to allow for variation of the relative speed of the reel which adjustment is capable of being manually made by the operator.

Various other adjustable-type control mechanisms for combine reels have been proposed. One such type is the rack-and-pinion type disclosed in U.S. Pat. No. 2,817,976. It has also been proposed to provide fluid motor drives for combine reels which are manually adjustable from the operator's station of the vehicle. However, so far as applicant is aware, no device has been proposed which would be capable of automatically driving the combine reel at a predetermined speed ratio with respect to the speed ratio of another device and particularly the speed ratio of the combine traversing the ground.

SUMMARY OF THE INVENTION

The present invention contemplates an automatic speed control unit for maintaining a predetermined ratio between the rotational speed of a rotating device with respect to the operational speed of the harvesting machine. The speed control unit incorporates a first element rotated at a speed which is the function of the speed of the harvesting machine, a second element rotated at a speed which is a function of the rotational speed of the device and mechanism connected to one of the elements for automatically varying the flow of fluid to a fluid motor which drives the device whenever the rotational speed of the device or the machine is changed.

Thus, the primary object of the present invention is to provide a speed control unit which is capable of automatically maintaining a predetermined ratio between the speed of two devices forming part of the harvesting machine.

Another object is to provide an improved mechanism for automatically correlating the speed of a driven device with the speed of the machine incorporating the driven device.

A further object is to provide an automatic speed control unit for a combine reel which is capable of maintaining various given predetermined speed ratios with respect to a ground speed of the vehicle.

Other objects of this invention will appear in the following description and appended claims reference being had to the accompanying drawings forming a part of this specification wherein like reference characters designate corresponding parts in the several views.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is only for the purpose of description.

Figure 1:
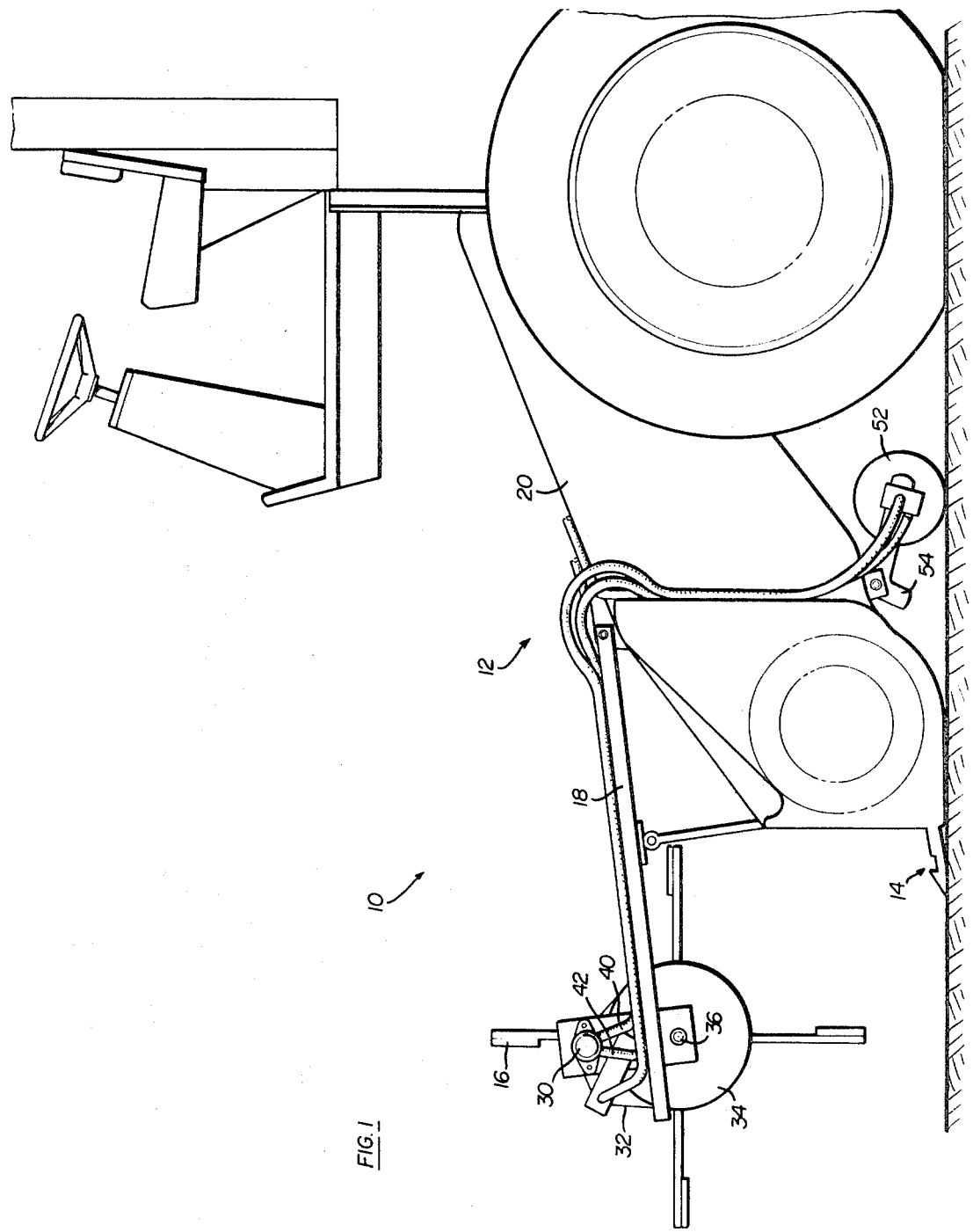
FIG. 1 is a fragmentary side elevational view of a conventional harvesting machine having the present invention incorporated therein.
Figure 2:
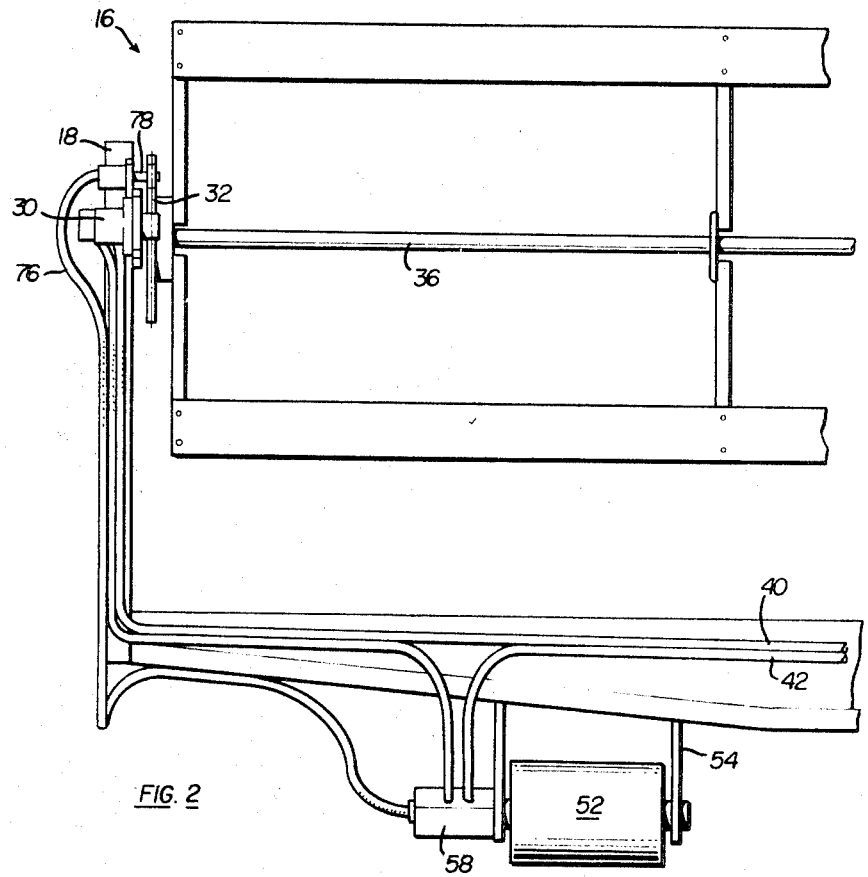
FIG. 2 is a fragmentary plan view of the harvesting machine shown in FIG. 1.

FIG. 1 of the drawings discloses a conventional harvesting machine 10, such as a self-propelled combine. The portion of the combine shown in the drawings discloses a cutting and transfer mechanism 12 which includes a conventional cutter bar 14 a harvesting reel 16 rotatively supported on a frame structure 18 and an elevator mechanism 20 for transferring the severed material to the conventional threshing mechanism forming part of the combine and not shown in detail since it forms no part of the present invention.

In the illustrated embodiment the harvesting reel is driven by a fluid motor 30 connected through a belt or chain 32 to a pulley 34 fixedly secured to the main axle 36 forming part of the combine reel.

Figure 3:
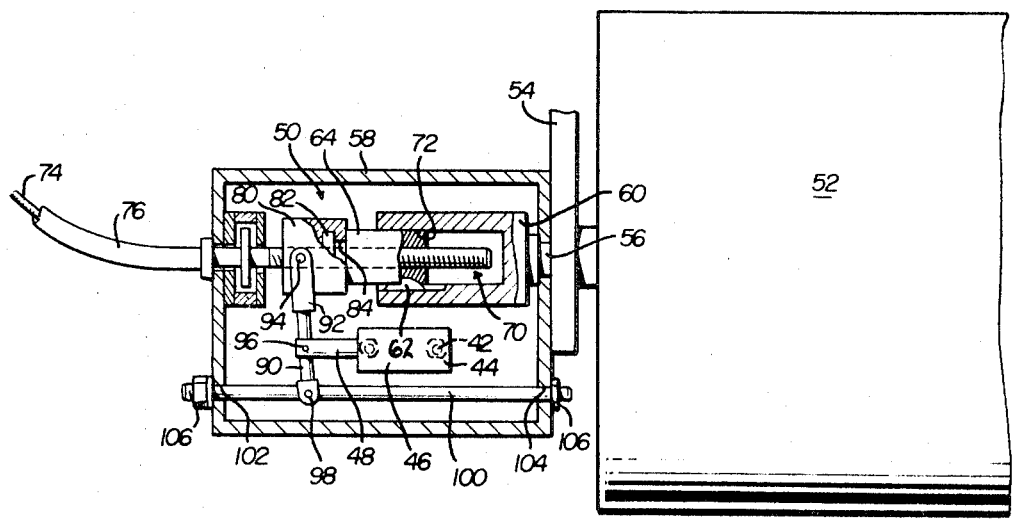
FIG. 3 is an enlarged plan view partially in section of the operating mechanism of the present invention.

Pressured fluid is supplied to the fluid motor 30 from a pressured fluid source (not shown) which forms part of the conventional combine. The fluid flows through two conduits 40 and 42 which are respectively connected to the fluid motor 30 with one of the conduits (42) having a control valve 44 (FIG. 3) controlling the flow of fluid in the conduits. Since the control valve 44 forms no part of the present invention a detailed description thereof does not appear to be necessary. Suffice it to say that the control valve includes a housing 46 slidably supporting a valve spool 48 which is movable in opposite directions to vary the flow of pressured fluid to the fluid motor thus increasing or decreasing the rotational speed of the combine reel 16.

According to the primary aspect of the present invention, a speed control unit is provided which is capable of automatically maintaining a predetermined rotational speed of the combine reel with respect to the rotational speed of another device not incorporated into the hydraulic control system for the fluid motor 30. Thus, a speed control unit 50 is operatively connected to the valve spool 48 and automatically moves the valve spool in opposite directions dependent upon the relative speed of another device.

In the illustrated embodiment, a freely rotatable roller 52 is rotatably supported in a bracket 54 which is pivotally carried on some part of the main mechanism of the combine. In the illustrated embodiment, the bracket 54 is supported on the lower housing of the elevator mechanism 20. The roller 52 engages the ground and thus rotates as a function of the speed of the combine or harvesting machine along a predetermined path which is generally accomplished by a prime mover forming part of the harvesting mechanism.

A shaft 56 extends beyond one side of the bracket 54 and into a housing 58 which may be secured to the bracket 54 in any suitable manner. A hub 60 is fixedly secured to the free end of the shaft 56 and is splined at 62 to a threaded member or element 64 thus allowing axial movement of the hollow threaded element or mated nut 64 with respect to the hub 60 while rotating the nut at the same rotational speed as the shaft.

A second element or threaded rod 70 is threadedly received in an opening 72 formed in the first element 64. The second element or threaded rod is rotated at a speed which is a function of the rotational speed of the combine reel 16 by the mechanism which will now be described.

The mechanism includes a flexible cable 74 rotated in a sheath or housing 76 and connected to a shaft 78 which is rotated by the chain or belt 32. Of course, the opposite ends of the sheath or housing 76 are respectively connected to the housing 58 and to the frame structure 18. Thus, it will be seen that the ground-engaging roller 52 will rotate the nut 64 at a speed which corresponds to the rate of movement of the combine along the ground while the threaded rod 70 is rotated at a speed which is a function of the rotational speed of the combine reel. The threaded interconnection between the elements 64 and 70 will thus maintain a fixed axial relationship between the elements when the two elements are rotated at a predetermined speed ratio. However, should the predetermined ratio of reel speed with respect to the ground speed be varied from the selected ratio, it will cause an axial shifting between the two elements 64 and 70.

The invention also contemplates connecting one of the two above elements to the control valve and more particularly to the valve spool 48 so that the axial shifting mentioned above will cause an automatic change in the flow of pressured fluid to the motor through the conduits 40 and 42. In the illustrated embodiment, this means includes a retainer or collar 80 which is attached to the first element or nut 64 by a flange 82 defining a recess 84 on the nut which receives a part of the collar or retainer 80. Thus, the retainer or collar is capable of being held in a nonrotational position but axially shifts with the nut or first elements 64.

A lever 90 has one end pivotally connected by a bracket 92 and pins 94 so as to be pivotally supported by the retainer or collar 80. The intermediate portion of the lever is connected to the control valve spool 48 by pin 96 while the opposite end of the lever is pivotally connected by a pivot pin 98 to a support 100.

According to a further aspect of the invention, means are provided for changing the predetermined speed ratio between the speed of the harvesting machine and the speed of the combine reel. The illustrated embodiment of the present invention, this means includes mechanism for moving the pivot pin 98. Thus, the mechanism for moving the pivot pin 98 includes means for axially shifting the support member 100 for the pivot pin 98. As noted in FIG. 3, the support member 100 is in the form of a rod which is threaded on both ends and which extends through openings 102 and 104 formed on opposite ends of the housing 58. The ends of the rods extend beyond the outer surface of the housing 58 and have nuts 106 threaded thereon. It can readily be appreciated that rotation of the respective nuts 106 in the appropriate direction will cause an axial shifting of the mechanism or rod 100 thereby shifting the position of the pivot pin 98 to vary the amount of pressured fluid flow for a given relative position of the retainer collar 80.

OPERATION

It is believed that the operation of the present invention can be understood from the above description. However, for purposes of clarity a brief description of the operation will now be described. Forward movement of the combine or harvesting machine will cause a rotational movement of the roller 52 to thereby rotate the first element or nut 64 about an axis at a speed which is a function of the speed of the harvesting machine. Simultaneously, rotation of the harvesting reel 16 by the fluid motor 30 through a predetermined flow of fluid through conduits 40 and 42 will cause a predetermined rotational speed of the second element or threaded rod 70 within the first element 64. If the two elements are rotated at a predetermined speed ratio set by nuts 106, they will be maintained in a fixed position with respect to each other by the threaded interconnection between the two elements. Thus, the retainer 80 will be held in a fixed position to thereby hold the valve spool 48 in a fixed position.

However, should either the ground speed or the harvesting reel speed be increased or decreased, this increase or decrease will cause an axial shifting of the retainer 80 and will pivot the lever 90 about pivot pin 98 to cause a shifting of the valve spool. A shifting of the valve spool will of course increase or decrease the flow of pressured fluid to the motor 30 to increase or decrease the speed of the reel 16.

Thus, it can be seen that the speed control unit of the present invention automatically correlates the speed of the reel with respect to the speed of the combine and maintains a predetermined ratio between these two speeds. The predetermined ratio may readily be changed merely by an axial shifting of the rod 100 so as to vary the flow through conduits 40 and 42 for any given position of the retainer or element 80.

While the element for sensing the ground speed of the machine has been illustrated as a ground engaging roller 52, it is readily apparent that various other mechanisms may be utilized as a sensing element for defining a control speed for the first element or nut 64. By way of example and not of limitation, if the combine were of the pull type, the first element 64 could be driven by mechanism which engages the power takeoff shaft which defines the input to the combine. Alternatively, the speed of the sensing element could be controlled by the main drive axle for the combine.

While one exemplary embodiment of the invention has been described in detail, it will be apparent to those skilled in the art that the disclosed embodiment may be considered exemplary and changes may be made without departing from the spirit of the invention.

I claim:

1. In a harvesting machine having prime mover means for propelling the machine along a path, a driven device, fluid motor means driving said driven device, first and second fluid conduits connected to said fluid motor and a source of fluid under pressure adapted for conveying pressured fluid for driving said fluid motor means and control valve means included in one of said conduits for controlling the flow of the pressured fluid and thus the speed of the driven device, the improvement of means for correlating the speed of said driven device with the speed of the machine along the path and comprising a sensing unit operably connected to said machine for sensing the speed of said machine along path, and means operably connected to said sensing unit, said driven device and said control valve for positioning said control valve means as a function of the speed of said machine and said driven device whereby the flow of pressured fluid and thus the speed of said driven device are automatically correlated to the speed of said machine along said path.

2. A harvesting machine as defined in claim 1, in which said last means comprises a first element connected to said sensing unit to be rotated at the speed of said machine along said path, a second element connected to said driven device to be rotated at the speed of said driven device, cooperating means operably connecting said elements for maintaining a fixed relation between said elements when the elements are rotating at a predetermined speed ratio and for producing relative movement between said elements when the speed of said elements to said control valve means to correlate the position of said valve to the relative position of said elements.

3. A harvesting machine as defined in claim 2, in which said cooperating means comprise mating threads on said elements interengaged to axially movably interconnect said elements.

4. A harvesting machine as defined in claim 2, including the further improvement of a housing enclosing said first and second elements and said control valve, said means operatively connecting one of said elements to said control valve comprising a lever having one end connected to said one element and the opposite end pivoted on a support member restrained within said housing with said lever operatively connected intermediate its ends to said control valve, said support member being selectively movable to change the pivot position of said lever to thereby adjust the correlated speed of said driven device to a given speed of said machine.

5. In a combine having a harvesting mechanism propelled at a given speed and a harvesting reel driven by a fluid motor and pressured fluid, the flow of which is selectively controlled by a valve spool of a control valve, the improvement of means cooperating with said valve spool for positioning said valve spool as a function of the speed of said reel and said harvesting mechanism whereby to maintain a predetermined ratio of said reel speed with respect to said harvesting mechanism speed.

6. In combination with a harvesting machine propelled at varying speeds and a device rotated on said machine by a fluid motor driven by flowing pressured fluid and including a control valve which controls the flow of said pressured fluid, a speed control unit for maintaining a predetermined ratio between the speed of said machine and speed of rotation of said device, said unit including a first element rotated about an axis at a speed which is a function of the speed of said harvesting machine, a second element rotated about said axis at a speed which is a function of the speed of rotation of said device, threaded means interconnecting said elements and normally maintaining a fixed axial relation between said elements at said predetermined speed ratio but causing axial shifting of said elements at changes in speed of rotation of either of said elements and pivoted lever means connecting one of said elements to said control valve whereby axial shifting of said one element changes the flow of pressured fluid to said motor to thereby reestablish said predetermined speed ratio.

7. The combination as defined in claim 6, in which said speed control unit includes a rotating roller engaging the ground with said first element driven by said roller and said second element includes a rod operably connected to said rotatable device and threadedly received in an opening in said first element to define said threaded means.

8. In a combine having a harvesting reel rotated by a fluid motor fluidly connected to a source of fluid under pressure and to a control valve, said control valve having a valve spool controlling the flow of pressured fluid to said fluid motor and means for maintaining a predetermined rotational speed of said reel, the improvement of said means comprising a first rotating element defining a control speed for said reel, a second element, means rotating said second element as a function of the rotational speed of said reel, means operatively interconnecting said elements and maintaining a fixed relation between said elements when said reel is rotating at said predetermined rotational speed but causing relative movement between said elements when said reel is rotating at other than said predetermined rotational speed, and means connected to one of said elements for shifting said valve spool in response to relative movement of said elements whereby to vary the flow of pressured fluid to maintain said predetermined rotational speed of said reel.